US005522260A

United States Patent [19]

Chappellat et al.

[11] Patent Number: 5,522,260
[45] Date of Patent: Jun. 4, 1996

[54] METHOD AND APPARATUS FOR DETERMINING A DEPTH CORRECTION FOR A LOGGING TOOL IN A WELL

[75] Inventors: Hervé Chappellat, Marseille; Michel V. Berard, Palaiseau; Philip S. Cheung, Montesson, all of France

[73] Assignee: Schlumberger Technology Corporation, Ridgefield, Conn.

[21] Appl. No.: 224,641

[22] Filed: Apr. 7, 1994

[30] Foreign Application Priority Data

Apr. 9, 1993 [FR] France ................................ 93 04229

[51] Int. Cl.$^6$ ................................................ E21B 47/00
[52] U.S. Cl. ........................................................ 73/151
[58] Field of Search ......................... 73/151, 152, 151.5; 166/250, 255

[56] References Cited

U.S. PATENT DOCUMENTS

| | | | |
|---|---|---|---|
| 4,131,875 | 12/1978 | Ingram | 73/152 |
| 4,541,275 | 9/1985 | Kerzner | 73/152 |
| 4,545,242 | 10/1985 | Chan | 73/151 |
| 4,567,759 | 2/1986 | Ekstrom et al. | 73/152 |
| 4,662,209 | 5/1987 | Brown | 71/1 |
| 4,718,168 | 1/1988 | Kerr | 33/133 |
| 4,756,188 | 7/1988 | Fennell | 73/151 |
| 4,909,075 | 3/1990 | Flaum et al. | 73/152 |
| 5,062,048 | 10/1991 | Coulter et al. | 364/422 |
| 5,198,770 | 3/1993 | Decorps et al. | 73/152 |
| 5,351,531 | 10/1994 | Kerr | 73/151 |

FOREIGN PATENT DOCUMENTS

| | | | |
|---|---|---|---|
| 0361996 | 4/1990 | European Pat. Off. | E21B 47/04 |
| 0426564 | 8/1991 | European Pat. Off. | G01V 3/38 |
| 0502757 | 9/1992 | European Pat. Off. | E21B 49/00 |

*Primary Examiner*—Richard Chilcot
*Assistant Examiner*—George M. Dombroske
*Attorney, Agent, or Firm*—Martin D. Hyden; Leonard W. Pojunas

[57] ABSTRACT

A method of determining a depth correction for a logging tool that is moved, while suspended from a cable, along a well, the method being of the type in which a measurement of tool depth is performed at the surface at successive instants, the tool comprising at least two sensors suitable for measuring a characteristic of the well at each instant said two sensors being offset longitudinally in the displacement direction of the tool. The method comprises, at each of said instants:

determining a first value for tool velocity by intrinsic measurement;

determining a second value of the velocity by correlation between information received from the two sensors; and combining the first and second velocity values to determine a depth correction to be applied to the surface depth measurement.

25 Claims, 10 Drawing Sheets

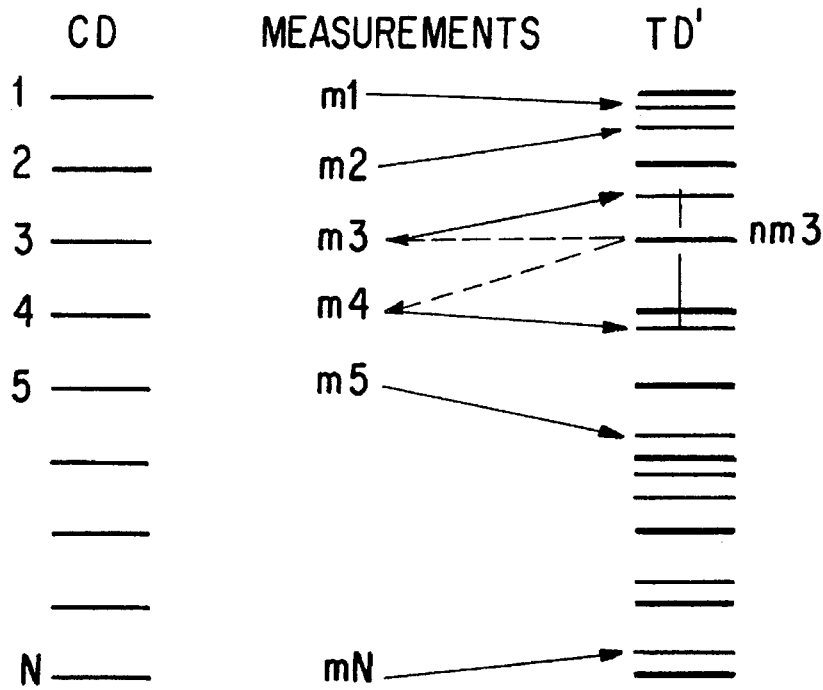
FIG. 5
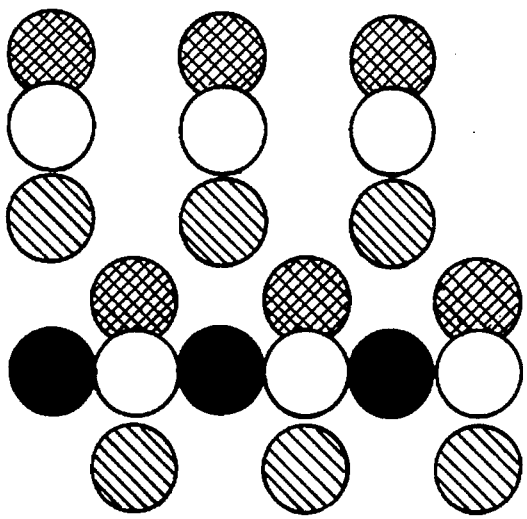
FIG. 8
V > Vo   LEVEL   K-3
V < Vo   LEVEL   K-3
V = Vo   LEVEL   K-3
         LEVEL   K

METHOD AND APPARATUS FOR DETERMINING A DEPTH CORRECTION FOR A LOGGING TOOL IN A WELL

The present invention relates to a method and to apparatus for determining the depth of a logging tool designed to perform geological and/or physical measurements in a well. More precisely, the invention relates to a method and to an apparatus for determining the correction to be applied to the measurement that is supposed to represent the depth of the logging tool so as to make it possible to estimate more accurately the real depth of the logging tool while it is performing measurements in the well where the tool has been inserted.

It is known that logging tools, also known as "sondes", are constituted by an elongate body including measuring instruments in the form of sensors and designed to perform physical measurements of at least one characteristic of the geological strata at the wall of the well. The measured physical characteristics, e.g. electrical or nuclear or other characteristics, are used, generally in combination with other information, to determine the presence of a hydrocarbon reservoir, the nature and the extent of the reservoir, and other characteristics.

Logging tools include sensors that differ as a function of the measured characteristics and of the looked-for information. Sondes are usually inserted into a well and lowered to the bottom of the well suspended from a cable which is wound round a winch on the surface. Once lowered, they are raised continuously towards the surface while performing measurements. The sonde also contains electronic means enabling the signals from the sensors to be transformed, and means enabling said signals to be transmitted to the surface via the cable. The information is recorded on the surface and is processed, either on site or in a specialized center.

The depth of wells in which such measurements are performed may be as much as 6 km. While measurements are being performed, the upwards velocity of the sonde and the length of the cable (called "cable depth") are measured on the surface with relatively high accuracy. For example, the length of the cable is measured while winding up by means of magnetic or other marks disposed at regular intervals along the cable, and/or by means of a sheave rotated by the displacement of the cable. Measurements of tool acceleration are also available.

The sonde performs measurements in the well at regular intervals, lying in the range a few mm to several tens of cm. In other words, measurements are triggered in the sonde at a period that corresponds to the time required by the cable to be wound up through a given unit length. For example, the unit length for high resolution logging tools is about 2.54 mm, while tools of lower resolution perform measurements at unit intervals that may be great as 15 cm.

The different successive depths at which measurements are performed are called "cable depths" with reference to the notion of the depth as estimated by measurements performed at the surface on the cable.

If the movement of the sonde in the well were to follow the winding movement of the cable exactly while the sonde was being raised, then the position of the sonde during winding as measured in terms of cable length (i.e. "cable depth") would correspond exactly to the real position or "real depth" of the sonde in the well.

Unfortunately, in practice, the sonde does not move at uniform velocity in the well. The movement of the sonde is in fact constituted by a succession of decelerations and accelerations due firstly to friction against the walls of the well (particularly in a deviated well), and secondly to the elasticity of the cable. In the profession, this phenomenon is known as the "yo-yo" effect. As a result, the true depths at which successive measurements are performed do not correspond to the cable depths, i.e. to the depths as measured at the surface on the basis of cable winding.

Unfortunately, logging measurements are based on measurements performed on geological strata disposed at depths that need to be known accurately. The higher the resolution, the greater the difficulty, where resolution can easily be 1 cm in recent sondes. If a resolution of 1 cm is compared with a well depth of several thousand meters, it will be understood how important it is to determine the position of the sonde with very great accuracy during measurement. By comparing these figures, it can be seen how difficult such measurements can be.

The invention relates more specifically to a method and an apparatus suitable for determining a correction applicable to the measured cable depth so as to determine with great accuracy and reliability the true depth of the tool.

Methods are known that seek to correct cable depth so as to determine true depth.

Known methods for providing a depth error correction rely on measuring the acceleration of the tool which is measured at each depth level where logging measurements are performed by means of an accelerometer giving the acceleration of the tool along its axis, with allowance being made for the effect of acceleration due to gravity. Mathematical formulae and algorithms exist for establishing the true depth of the tool on the basis of a measured acceleration and the instant of measurement. Such algorithms are proposed, for example, in U.S. Pat. No. 4,545,242 (inventor David S. K. Chan) in the form of a Kalman filter associated with an algorithm that tends to detect the positions in the well where the tool is blocked in order to modify the application of the Kalman filter. Another algorithm is described in European patent application No. 0 361 996 (inventors Howard and Rossi) in which a Kalman filter is combined with a dynamic model of the damped resonance response of the length of cable.

In addition to the difficulty of obtaining a reliable error correction at present, another problem is linked to the fact that once the correction has been applied, it is extremely difficult or even impossible to estimate the reliability of the correction as made.

Certain logging tools make it possible to estimate the effect of the applied correction. This is true of tools having very high resolution, and this applies, for example, to the tool made by the Applicant known commercially under the name "FMS" or the Formation Micro Imager (FMI) tool, for performing electrical measurements using pellets or buttons in groups on pads that slide over the walls of the well. The electrical signals resulting from the measurements make it possible to form a two-dimensional image corresponding to a strip extending along the surface of the well wall in the displacement direction of the tool, and also in a direction orthogonal thereto. When depth correction is applied to data delivered by such tools, depth correction errors (due to an unsuitable error correction method) appear very clearly in the form of artifacts or anomalies in the final image, and having the appearance of the button configuration. Attempts at remedying that drawback have been made such as that described in European patent application No. 0 426 564 (inventor M. Y. Chen). However that is not a depth correction proper.

In this context, the invention provides a method and an apparatus enabling a reliable depth correction to be made and making it possible to determine the true depth of the tool with accuracy that is compatible with existing tools. The invention also provides a depth correction method whose effect can be estimated after the event by the user.

To this end, the present invention provides a method of determining a depth correction for a logging tool that is moved, while suspended from a cable, along a well, the method being of the type in which an intrinsic measurement of tool depth is performed at the surface at successive instants, the tool comprising at least one sensor suitable for measuring a characteristic of the well at each of said instants, the method being characterized in that, at each of said instants:

- a first value for tool velocity is determined by intrinsic measurement;
- a second value of the velocity is determined by correlation between information received from two identical sensors that are offset longitudinally in the displacement direction of the tool; and
- the first and second velocity values are combined to determine a depth correction to be applied to said intrinsic depth measurement.

Preferably, the intrinsic velocity measurement is performed by an accelerometer.

The invention will be better understood in the light of the following description of a non-limiting and illustrative example, given with reference to the accompanying drawings, in which:

FIG. 5 shows the principle of depth correction, once the true depth has been determined;

FIG. 8 shows a series of three sensors at different positions and illustrates the method of the invention for determining the true depth correction;

Figure 1:
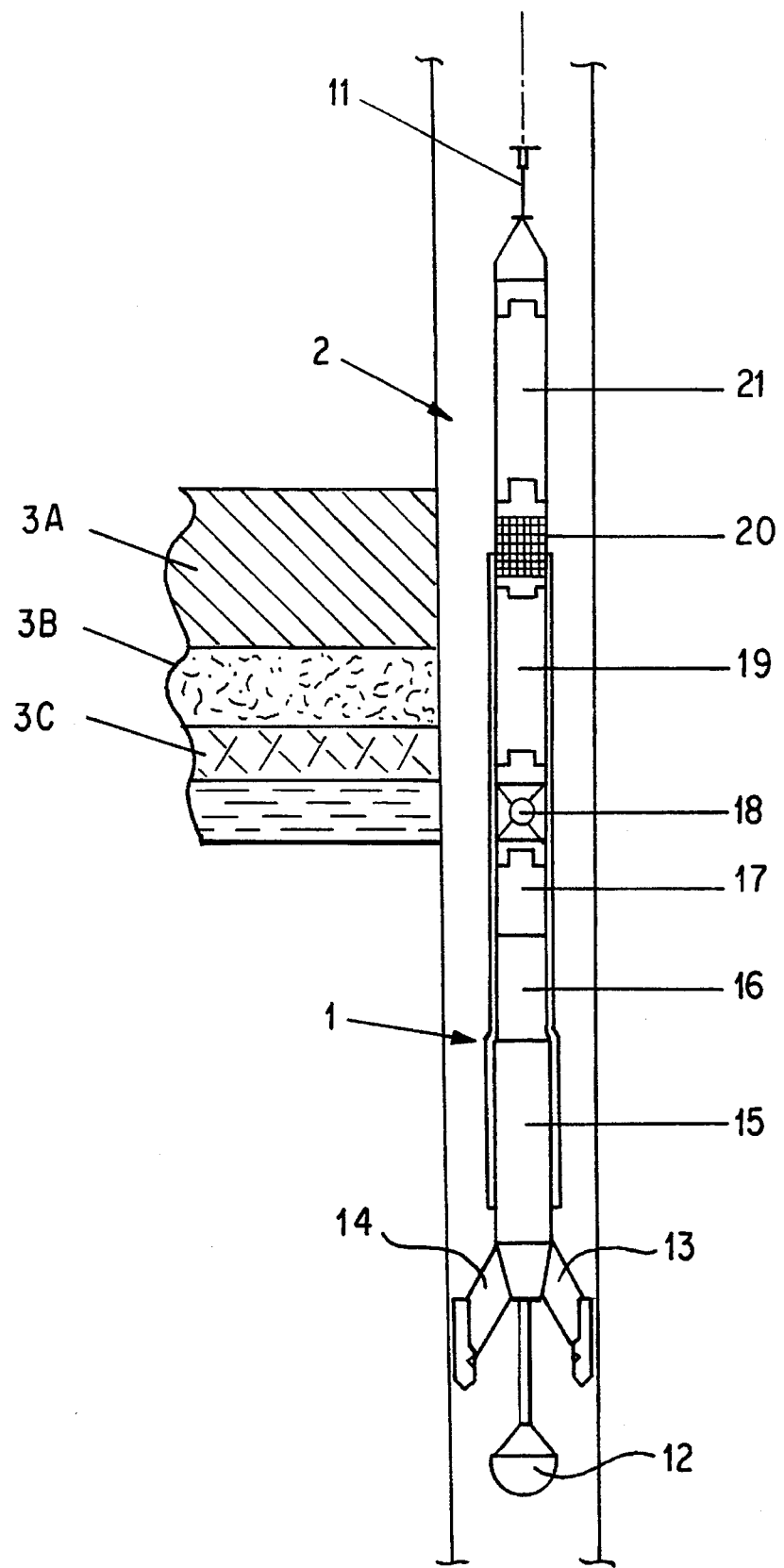
FIG. 1 is a diagrammatic side view of one example of a logging tool.

FIG. 1 is a diagrammatic side view of a logging sonde 1 suitable for being displaced along a well 2 that passes through geological formations 3A, 3B, and 3C. The sonde is suspended from a cable 11. The sonde 10 includes various different portions, namely, from the bottom up: a nose 12, followed by four arms at right angles, with only arms 13 and 14 being shown in the drawing. The arms are suitable for retracting against the body of the sonde or for being deployed so that their free ends bear against the wall of the well via respective rounded pads carrying sensors. In the example shown, namely a so-called "FMS" tool, each pad carries a series of sensors suitable for measuring the resistivity of geological layers at the well wall. The sensors and their dispositions on the pads are described below. Above the arms 13 and 14, there is a mechanical and hydraulic control unit 15 including a set of members suitable for actuating the pad-carrying arms 13 and 14 to move between their retracted positions and their deployed positions. Above the unit 15 there is preamplification electronics cartridge 16 in turn surmounted by a measurement assembly 17 including an inclinometer together with associated electronics, and designed to measure sonde acceleration. Given its great length, the sonde is provided with a hinge joint 18 above which there is an amplification electronics cartridge 19 surmounted by a stopper plug 20, above which there is a telemetry cartridge 21 acting as an interface with the cable.

Figure 2:
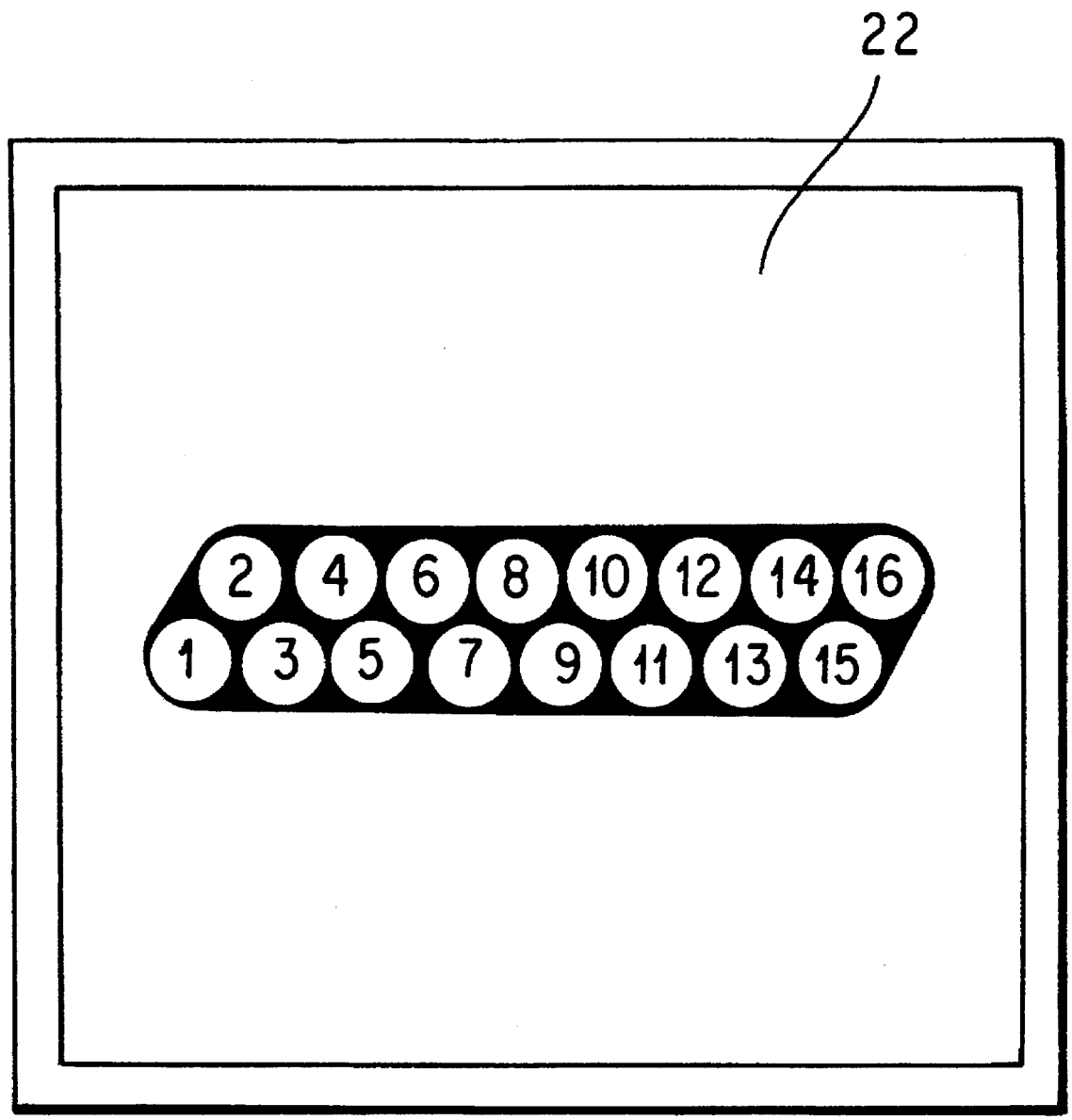
FIG. 2 is an enlarged view of a pad carrying sensors disposed in a matrix, and belonging to an imaging tool.

FIG. 2 is a detail view of the front face of a pad 22 provided with sixteen sensors disposed in two parallel rows, namely a first row having even-numbered sensors disposed above a lower row including the odd-numbered sensors. Both rows are substantially orthogonal to the axis of the tool and they are parallel to each other, with the two rows being offset relative to each other in an azimuth direction. Thus, for example, sensors 1, 2, and 3 form a triangle whose sensors 1 and 3 constitute a horizontal base while sensor 2 is disposed at an upper vertex.

Figure 3:
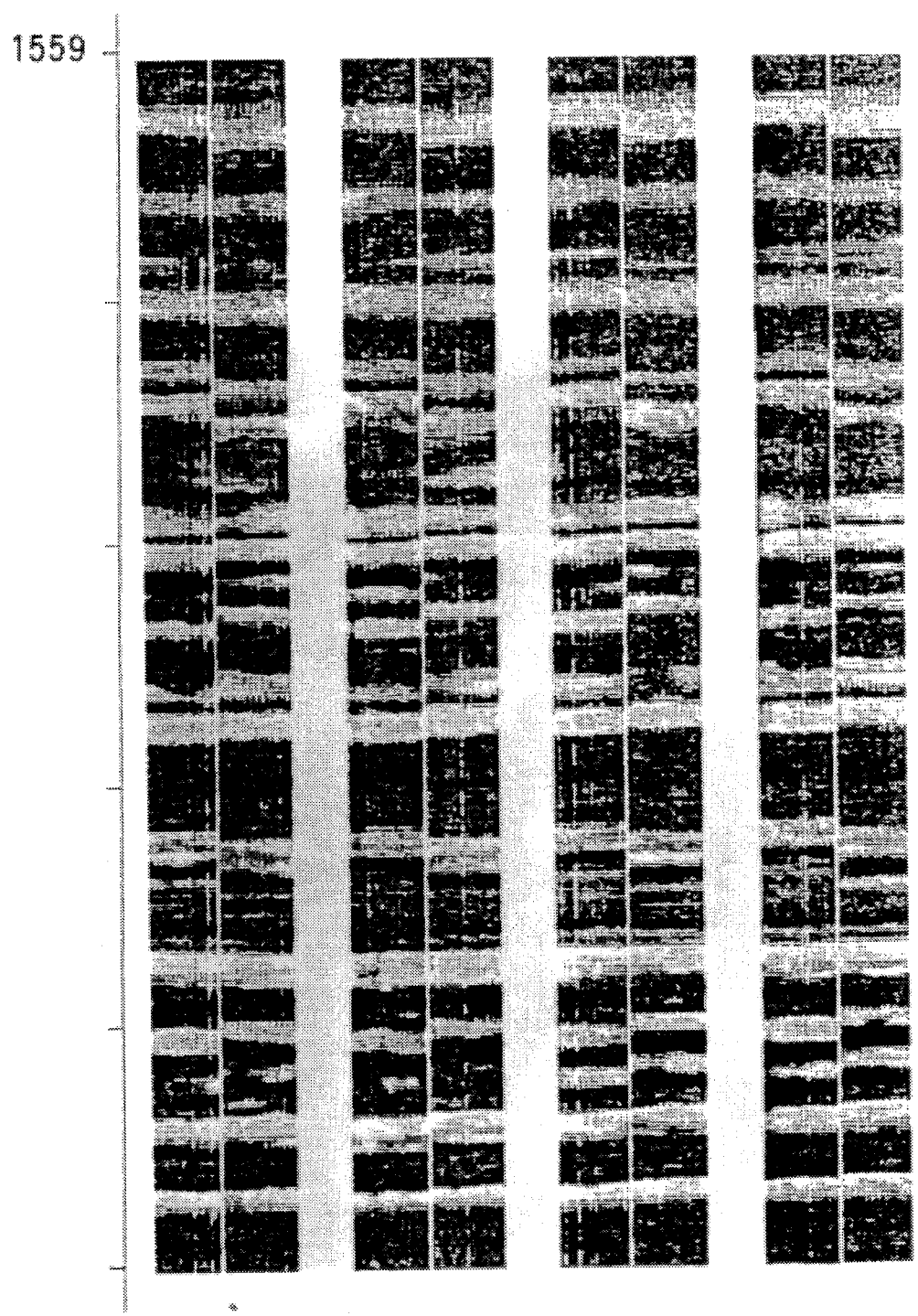
FIG. 3 shows one example of an image of a well wall as obtained by the tool of FIG. 1 and in the absence of depth correction.

FIG. 3 shows one example of the kind of image that can be obtained by the measurements from a tool of the kind shown in FIGS. 1 and 2. The image is made up of vertical strips in which the vertical axis corresponds to depth, and each strip corresponds to one pad. The zones of the image that are black, white, or various shades of gray correspond to differently resistivity values. Each strip is made up of sixteen columns corresponding to one of the sensors 1 to 16 of a given pad.

Reference is made to FIG. 2 which is a block diagram comprising a block 25 representing the measured acceleration along the axis of the tool as provided by the inclinometer 17 of the sonde 10. The acceleration value is injected into a depth correction block 26. The values from the block 26 are conveyed to a block 28 which receives measurements from the sensors (block 27) and of the cable depth CD (block 29) for sampling and interpolation. The block 28 resamples the measurements at the same sampling rates as cable depth. The corrected measurements at each sampling level are calculated by linear interpolation. The sampling/interpolation block 28 delivers measurements that are repositioned depthwise (block 30).

FIG. 5 shows a conventional step of sampling and interpolation on the basis of successive cable depth (CD) levels 1 to N in the form of successive parallel and uniformly spaced apart lines. On the righthand side of FIG. 5, there can be seen a succession of thick lines that are equidistant and that correspond to the CD levels 1 to N. Between the thick lines, there can be seen finer lines of apparently random distribution, with each line corresponding to a true depth or level at which the corresponding measurement was actually performed, and identified by the letter m accompanied by a numerical subscript corresponding to the given depth level. For example m1 is the first measurement and m5 is the measurement at level 5. The lines m1, m2 and so on do not coincide with the thick lines representing cable depth. Although the measurements were indeed performed at uniform time intervals, because of the varying accelerations of the tool, they were actually performed at true tool depths that do not correspond to cable depths (even though the cable is being wound up on the surface at a constant velocity). Interpolation consists in recalculating measurement values (after new sampling) for depths that correspond to the thick lines (and that correspond to the cable depths CD). For example $$nm_3 = (1-x)m_3 - xm_4.$$

Figure 6:
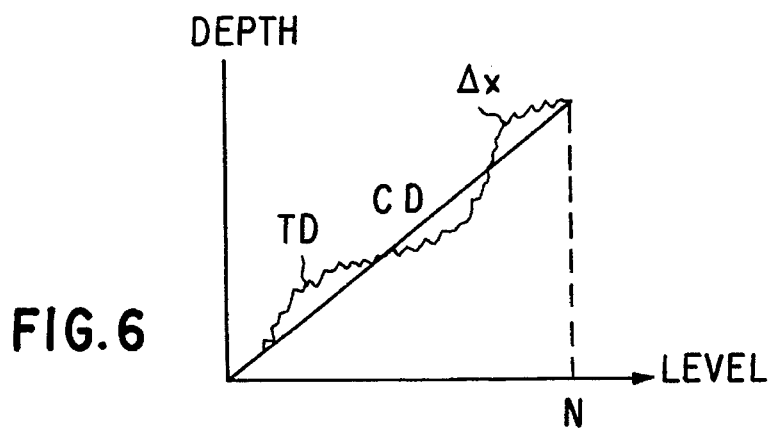
FIG. 6 shows variations in the true depth and in the cable depth respectively as a function of successive depth levels.

FIG. 6 shows cable depth as a solid line and varying linearly as a function of the various different depths 1 to N in the well. This is logical insofar as the cable depth is determined by the length of cable that has indeed been wound up, and is the result of a mechanical or physical measurement of the length of cable lowered down the well and then raised during measurement operations. In contrast, true depth (TD) in dashed lines follows a curve that moves away from the straight line representing cable depth CD, with the TD curve coinciding with the straight line CD of cable depth at the first level 1 and at the last level N for calibration purposes, respectively at the bottom of the well and at the surface.

In reality, the true depth has variations $\Delta x$ about the value TD. The curve TD=f(N) can be considered as being a carrier about whose value the depth ($\Delta x$) oscillates. The depth thus has low frequency variations (TD) and high frequency variations ($\Delta x$).

Figure 7:
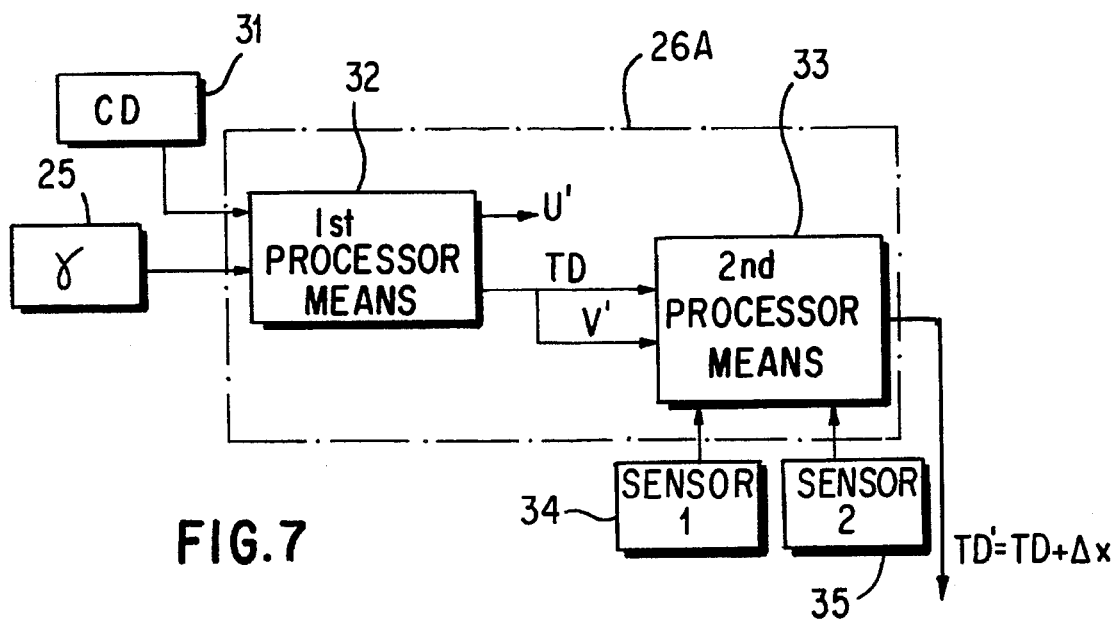
FIG. 7 is a simplified block diagram of the data processing applied in the method of the invention.

FIG. 7 is a block diagram showing the steps of the method of the invention from which it can be seen that the measured values coming firstly from the measurement block 25 that gives the accelerometer values and secondly from the apparatus for measuring cable depth CD (block 29) are applied to first processor means symbolized by block 32. Block 32 delivers firstly an instantaneous velocity v, and secondly a first true depth correction estimate, namely TD. These values are applied to second processor means (block 33) which also receive values from a pair of sensors, namely sensor 1 and sensor 2, represented by blocks 34 and 35. Sensors 1 and 2 respond to the same characteristic and they are offset in the sonde displacement direction. The second processor means (block 33) deliver a corrected depth value, namely $$TD'=TD+\Delta x.$$

The values of TD, CD and $\Delta x$ correspond to those mentioned with reference to above-described FIG. 6.

In outline, the first processor means (block 32) process the data from the inclinometer and the apparatus that measures cable depth by means of a filter and a special algorithm based on a Kalman filter, while the second processor means (block 33) refine the measurements performed by the first processor means on the basis of data from the sensors.

Figure 4:
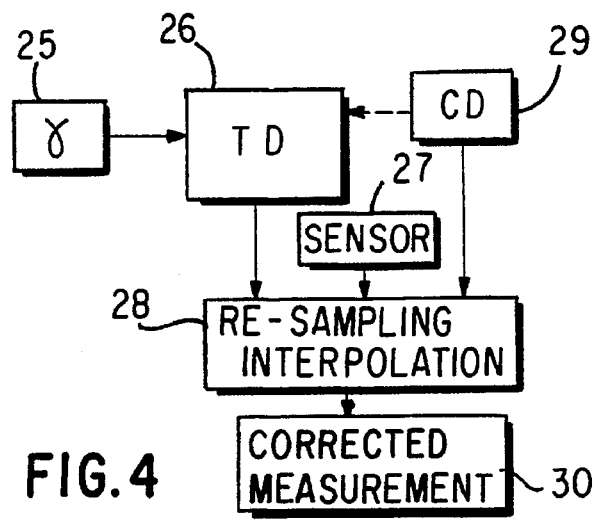
FIG. 4 is a simplified block diagram of prior art depth correction processing.

Dashed line block 26A including blocks 32 and 33 corresponds to functional block 26 in FIG. 4. Functional block 26A (FIG. 7) delivers a true depth value (TD') as used in a block 30 for resampling and interpolation, similar to the block 28 of FIG. 4 and for the purpose of calculating corrected measurement values.

In outline, the first step provides a correction that may be called a "low frequency" correction, while the second step performs a "high frequency" type correction.

The description below begins with the first processor means (block 32) suitable for delivering a first corrected true depth TD on the basis of acceleration, time, and cable depth data. The second processor means (block 33) are then described with reference to a particular, non-limiting implementation and with reference to a high resolution imaging tool, i.e. a tool of the type provided with at least one matrix of sensors providing measurements that enable some kind of image to be made of the wall of the well. It may be observed that this corresponds to one possible implementation amongst others and that the invention is naturally not limited to an application to imaging tools.

There follows a description of a preferred example of the first processor means suitable for delivering a first corrected value of true depth, i.e. TD, and corresponding to low frequency correction (FIGS. 6 and 7). The two kinds of data that are measured and processed comprise, firstly the component $g_k$ of tool acceleration along the axis of the well, and secondly the time $t_k$ between two successive measurements. It should be observed that $t_k$ constitutes the sampling period based on the cable depth measurement CD as performed on the surface. CD constitutes something that may be called an "intrinsic" measurement of depth. The following mathematical model is used that takes account of the two measured kinds of data $g_k$ and $t_k$, and also of the velocity $v_k$ and the position $z_k$ of the tool at the measurement instant, for a level or depth k:

$$v_{k+1}=v_k+t_{k+1} \tag{1}$$

$$x_{k+1}=x_k+v_k t_{k+1}+\ll g_{k+1}(t_{k+1})2 \tag{2}$$

Another way of expressing the above mathematical model is as follows:

$$x_{k+1}=A_k.X_k+B_k.U_k \tag{3}$$

where $$X_k=\begin{pmatrix} z_k \\ v_k \end{pmatrix}, A_k=\begin{pmatrix} 1 & t_{k+1} \\ 0 & 1 \end{pmatrix}, B_k=\begin{pmatrix} 1/2 t_{k+1} \\ 1 \end{pmatrix}, \tag{4}$$

and $U_k = g_{k+1}t_{k+1}$

In this form, $X_k$ is usually called the state vector and the components of $X_k$ are called the state variables. $U_k$ constitutes the inputs of mathematical equations to be solved for estimating the state vector $X_k$ at each sampling level k. In theory, it can be shown that the above dynamic model is asymptotically unstable and consequently that it is not possible to process equations (1) and (2) by computer. A more elaborate model is used for the purpose of estimating the state of the system, i.e. the state vector $X_k$. One possibility consists in using a Kalman filter specially designed for linear systems, such as that described below. The invention proposes a Kalman type filter which is specially designed for this purpose and which includes the following elements and assumptions (also called observations in Kalman filter theory), and designed to take account of errors while measuring time and acceleration:

$$U_k=g_{k+1}t_{k+1}+W_k \tag{5}$$

where $W_k$ constitutes white noise of zero mean value, and of variance: $Q_k=E(W^2_k)$. This makes it possible to introduce the concept of measurement noise and of observation noise, in particular when measuring tool acceleration. In order to simplify system state estimation and make it more stable, all of the information that is available a priori is injected, e.g. the intrinsic cable depth measurement $CD_k$, i.e. the length of cable paid out to reach level k. As a first approximation to the position $z_k$ of the tool, it is assumed that:

$$CD_k=z_k+V^1_k \tag{6}$$

equation (6) is suitable for being expressed in matrix form as a function of the state vector:

$$CD_k=(1\ 0)K_k+V^1_k \tag{7}$$

In equation (7) $V^1_k$ is zero-average white noise, called "measurement noise". It may be observed that the cable depth CD in most logging operating conditions constitutes an item of data that is reasonably representative of the position of the tool. Similarly, another item of a priori information that can be used is any data relating to the velocity $v_k$ of the tool, such as the velocity of the cable as measured by conventional measurement devices associated with the drum onto which the cable is wound. However, the cable velocity is measured at a sampling rate that is much lower than that used for measuring acceleration and time. Furthermore, it has been observed experimentally that cable velocity is not very representative of actual or true tool velocity, most particularly in wells that are highly deviated. The measurement data that are available with high resolution are time and acceleration. These measurements are used not only as inputs into the mathematical equations, but also as observations or pseudo-measurements of tool velocity. To this end, a third state variable is used constituted by the velocity of the tool at the preceding sampling level, i.e. of index k–1, and written $v_{k-1}$. Thus, the state vector $X_k$ becomes:

$$X_k = \begin{pmatrix} z_k \\ v_k \\ v_{k-1} \end{pmatrix} \quad (8)$$

and at level k the following is obtained:

$$g_k t_k = v_k - v_{k-1} + V^2_k = (0\ 1\ -1)X_k + V^2_k \quad (9)$$

where $V^2_k$ is second zero-average white noise measurement. The first and second white noise $V^1_k$ and $V^2_k$ and $W_k$ are defined as follows in matrix form:

$$R_k = \begin{pmatrix} E[V^1_k{}^2] & E[V^1_k V^2_k] \\ E[V^1_k V^2_k] & E[V^2_k{}^2] \end{pmatrix} \quad (10)$$

and $$S_k = (E[W_k V^1_k] E[W_k V^2_k]) \quad (11)$$

The final description of the system is as follows in terms of state and observation data:

$$\begin{aligned} X_{k+1} &= A_k X_k + B_k U_k + G_k W_k \\ Y_k &= C_k X_k + V_k \end{aligned} \quad (12)$$

where $$X_k = \begin{pmatrix} z_k \\ v_k \\ v_{k-1} \end{pmatrix}, \quad Y_k = \begin{pmatrix} CD_k \\ g_k t_k \end{pmatrix}, \quad (13)$$

$$U_k = g_{k+1} t_{k+1}, \quad V_k = \begin{pmatrix} V^1_k \\ V^2_k \end{pmatrix}$$

and $$X_k = \begin{pmatrix} 1 & t_{k+1} & 0 \\ 0 & 1 & 0 \\ 1 & 1 & 0 \end{pmatrix}, B_k = G_k = \begin{pmatrix} 1/2 t_{k+1} \\ 1 \\ 0 \end{pmatrix}, \text{ and} \quad (14)$$

$$C_k = \begin{pmatrix} 1 & 0 & 0 \\ 0 & 1 & -1 \end{pmatrix}$$

with $$E = \left\{ \begin{bmatrix} W_k \\ V^1_k \\ V^2_k \end{bmatrix} [W_k V^1_k V^2_k] \right\} = \begin{pmatrix} Q_k & S_k \\ S^T_k & R_k \end{pmatrix} \quad (15)$$

Equations (11) to (15) constitute a model suitable for use in conjunction with a Kalman filter. For such a model, the Kalman filter makes it possible, at each measurement level, and in recursive manner, to obtain the beset linear estimate of the state vector $X_k$, in the least squared sense.

More precisely, starting from a set of observations up to sampling level k:

$$(Y_0, Y_1, \ldots, Y_k) \quad (16)$$

The Kalman filter makes it possible to provide an optimal linear estimator for $X_k$, usually called $X'_{k/k}$. The term "optimal" is used herein in its least squared sense, which means that $X'_{k/k}$ minimizes the following norm:

$$E\{\|X_k - X_{k/k}\|^2\} \quad (17)$$

The Kalman filter also makes it possible to obtain $X'_{k+1/k}$ which is the optimal prediction of $X_k$ at the following level on the basis of all of the observations up to sample k. The Kalman filter equations are the following:

$$X_{k+1/k} = (A_k - G_k S_k R_k^{-1} C_k) X_{k/k} + B_k U_k + G_k S_k R_k^{-1} Y_k \quad (18)$$
$$\Sigma_{k+1/k} = (A_k - G_k S_k R_k^{-1} C_k) \Sigma_{k/k} (A_k - G_k S_k R_k^{-1} C_k)^T +$$
$$G_k (Q_k - S_k R_k^{-1} S_k^T) G_T^k$$
$$L_{k+1} = \Sigma_{k+1/k} C_{k+1}^T (C_{k+1} \Sigma_{k+1/k} C_{k+1}^T + R_{k+1})^{-1}$$
$$X_{k+1/k+1} = X_{k+1/k} + L_{k+1}(Y_{k+1} - C_{k+1} X_{k+1/k})$$
$$\Sigma_{k+1/k+1} = (I - L_{k+1} C_{k+1}) \Sigma_{k+1/k} (I - C_{k+1}^T L_{k+1}^T) +$$
$$L_{k+1} R_{k+1} L_{k+1}^T$$

In equations (18) the superscript T designates the matrix transposition operation.

When error correction is performed in differed time, i.e. when it is not performed at the instant of acquisition, a smoothing operation is provided and added to the Kalman filter The smoothed estimate $X'_{k/N}$ is the optimal linear estimate of the state vector $X_k$ based on all of the available measurements:

$$(Y_0, Y_1, \ldots, Y_k, \ldots, Y_N) \quad (19)$$

Given the results from the Kalman filter, the smoothed estimate is evaluated recursively using the following equation:

$$X_{k/N} = X_{k/k} + \Sigma_{k/k}(A_k - G_k S_k R^{-1}{}_k C_k)^T \Sigma^{-1}{}_{k+1/k}(X_{k+1/N} - X_{k+1/k}) \quad (20)$$

When implementing the above-described model, it is necessary to know the value of the input noise variance $Q_k$, of the observation noise variance $R_k$, and of the correlation coefficients $S_k$ between the input noise and the observation noise. These values are estimated empirically during a state that immediately precedes Kalman filter calculation, by detecting zones during which the sonde is blocked, thereby enabling operation of the Kalman filter to be modified accordingly. This means that if the tool is considered as being blocked at sampling level k, the following is set with a probability of 1: $v_k=0$ and $\sigma_k=0$. The sonde is detected as being blocked by calculating the variance $\sigma^2_k$ of the acceleration over a sliding window and determining therefrom zones in which $\sigma^2_k$ is very small compared with the mean standard deviation $\sigma^2_k$, calculated over a larger window. $Q_k$ and $R_k$ are taken as being proportional to $\sigma^2_k$, and the proportionality coefficients are taken as being parameters for adjusting the algorithm. For the correlation coefficients given by equation (11), it is assumed that the acceleration measurement noise and the depth observation noise $V^1_k$ are not correlated, so that $E[W_k V^1_k]=0$. The following can then be written:

$$E[W_k V^1_k] = \frac{1}{2} Q_k \quad (21)$$

Once the position of the tool $z_k$ is known at each level, the first depth correction can be applied so as to enable the largest or coarsest errors to be corrected, whence the expression used above of "low frequency" correction. Error correction in this first step is particularly necessary in highly deviated wells where movement of the tool is typically constituted by periods of acceleration followed by periods of deceleration.

Once the first step (as described above) has been performed, a second depth correction step is performed relative to the values as corrected by the first step, thereby implementing high frequency correction and refining depth correction.

The second stage of error correction is represented by block 33 in the diagram of FIG. 7.

This second correction step makes use of an algorithm suitable firstly for correlating data from at least two identical sensors that are offset longitudinally, and secondly for combining the result of such correlation with the acceleration (as processed by the first processor means, block 32). Block 33 is described below by way of example in its application to a tool provided with a plurality of sensors disposed on the same pad, in two rows of buttons, e.g. an FMI tool or an FMS tool. The second means refine the correction on the basis of data from the sensors by means of an intrinsic estimate of tool velocity at each sampling depth or level. The velocity to which allusion is made above is the derivative of true depth by cable depth:

$$\frac{dTD}{dCD}(k) = v_k \qquad (22)$$

Once this derivative has been calculated, it is then integrated in order to determine a more accurate value for depth correction, given that the integration step makes use of a Kalman filter, as described below.

This first derivative can be estimated because sensors are available that are offset in the displacement direction of the tool. Thus, each sensor matrix contains depth information in the sense that it is capable of "recognizing" a change of formation during upwards movement of the tool from the lower row towards the upper row.

There follows a description of an implementation of the algorithm of the invention as applied to processing data from a logging tool of the FMS type, as shown diagrammatically in FIG. 1.

The data from the upper row of sensors is associated with even references whereas the sensors in the lower row are associated with odd references. The two rows are separated by a distance n×dz which is an exact multiple of the depth sampling rate dz (e.g. dz=2.54 mm, and n=3). If two data sets are assumed to have been acquired at respective levels that are separated by n levels, and if the tool moves in exactly the same way as the cable moves at the surface, then the bottom row of the top data set should "see" exactly the same as has already been seen by the top row of the bottom set. Otherwise, if the tool is moving more quickly than the cable on the surface, the bottom row of the upper data set will see the same data before n levels. Conversely, if the tool is moving slower than the cable at the surface, then coincidence will take place later than n levels. This is illustrated in FIG. 8 which shows three sensors in a row for simplification purposes, with each sensor being represented by a circle, black circles corresponding to level k. White circles and striped circles correspond to level k+3. White circles correspond to the case where tool velocity is equal to cable velocity, white circles being disposed level with black circles. The striped circles are disposed beneath the white circles and correspond to the case where the velocity of the tool is less than the velocity of the cable, whereas the cross-hatched circles (situated above the white circles) correspond to the case where the tool velocity is greater than the cable velocity.

In a preferred implementation, the processing of measurements comprises the following steps:

1. information seen by the upper row of sensors at a level k is taken into consideration;
2. a search is made to determine the (fractional) number of levels $sh_u(k)$ at which the lower row of sensors at level $k+sh_u(k)$ "sees" the same information;
3. the information seen by the lower row of sensors at level k is treated in the same manner;
4. a (fractional) number of levels $sh_1(k)$ is looked for such that the upper row of sensors at level $k-sh_1(k)$ sees the same information;
5. assuming that the confidence in the estimates of $sh_u(k)$ and $sh_1(k)$ are respectively given by $w_u(k)$ and $w_1(k)$, the following can be written for level k:

$$\frac{dTD}{dCD}(k) = \frac{[w_1(k) + w_u(k)]n}{w_1(k)sh_1(k) + w_u(k)sh_u(k)} \qquad (23)$$

6. an estimate of TD(k) is calculated at each level on the basis of the calculated values for dTD/dCD(k).

It should be observed that prior to applying the algorithm mentioned above, the images must previously have been equalized since the signal from each sensor is preamplified by means of a specific hybrid circuit. Equalization serves to eliminate differences in offset and electronic gain for each sensor.

For the method as described by steps 1 to 6 above, steps 2 and 4 make use of a search for a fractional level number, so as to make it possible to determine more accurately the estimate of dTD/dCD(k).

Equation (24) calls on notions of fractional depth level number $sh_l$ or $sh_u$, whereas the lower and upper rows of sensors on a given pad are physically distant from each other by n×dz. With reference to $sh_u(k)$ assume that it is determined at level $k+sh_u(k)$ that the lower row of sensors reaches the depth occupied by the upper row of sensors at level k. This means that the tool has actually been displaced through n.dz whereas the cable depth (CD) has changed by a quantity equal to $sh_u(k).dz$. Consequently:

$$dTD(k)=n.ds \text{ and } dTD(k)=sh_u(k).dz \qquad (24)$$

This reasoning is based on the assumption that the value of n is known accurately. In the above algorithm, the quantity n.dz constitutes a length reference and distances are measured by adding such references to one another. In practice, even if it were possible to integrate equation (24) without error, it would still be true that the distance between two rows of sensors is not exactly n.dz. Thus, summing such a reference over a very long distance gives rise to a significant error. Nevertheless, as mentioned in the preamble, the object of the invention is to obtain a method enabling error to be reduced over short distances so that the relative distance between two points that are not too far apart is estimated relatively well.

The steps of the above-mentioned method are described below in greater detail.

The signals that are recorded at level k for a given pad are labelled in the preamble of the present application as follows: $S(k,j)$ where $j=1, \ldots, M$. M is the number of sensors and is equal to 16 in the present example, and the signals $S(k,2), \ldots, S(k,2p), \ldots, S(k,16)$ correspond to the top row of sensors, while the signals $S(k,1), \ldots, S(k,2p+1), \ldots, S(k,15)$ correspond to the sensors of the lower row. In order to determine a value for dTD/dCD(k), the above-mentioned $sh_u(k)$ and $sh_l(k)$ are estimated. In a preferred implementation, these values are calculated as a weighted mean of a set of local estimation values $sh_u(k),j$ and $sh_l(k),j$ calculated for each individual sensor. More precisely, for each pad, a value of $sh_u(k),j$ is calculated for all of the sensors corresponding to $j=2, 4, \ldots, N-2$. For each value of $sh_u(k),j$ a weight $w_u(k,j)$ is also produced that represents the level of confidence in the local estimated value.

Similarly, $sh_l(k,j)$ and $w_l(k,j)$ are calculated for all values of $j=3, 5, \ldots, 15$. This operation is repeated for all four pads of the tool. The final weight and estimate at sampling level k are generated in the following manner:

$$w(k) = w_u(k) + w_l(k) \quad (25)$$

$$= \sum_{\text{pads}} \sum_{j \text{ even}} w_u(k,j) + \sum_{\text{pads}} \sum_{j \text{ odd}} w_l(k,j)$$

$$sh(k) = \frac{1}{w(k)} (w_u(k)sh_u(k) + w_l(k)sh_l(k)) \quad (26)$$

$$sh(k) = \frac{1}{w(k)} \left( \sum_{\text{pads}} \sum_{j \text{ even}} w_u(k,j)sh_u(k,j) + \sum_{\text{pads}} \sum_{j \text{ odd}} w_l(k,j)sh_l(k,j) \right) \quad (27)$$

$$\frac{dTD}{dCD}(k) = n/sh(k) \quad (28)$$

There follows a description of how the local estimation values $sh_u(k,j)$ and $sh_l(k,j)$, and the weights $w_u(k,j)$ and $w_l(j,k)$ are determined.

Even and odd referenced sensors are used symmetrically by the method. Odd sensors are used for calculating $sh_u(k)$ during step No. 2 above, since they correspond to the upper row of sensors on the pad, whereas odd sensors are used for calculating $sh_l(k)$. The method is described below with reference to even sensors, it being understood that odd sensors constitute an entirely symmetrical situation.

At each level k, the following quantities are defined:

$$s(k,2p)=\tfrac{1}{2}(S(K-2,2p)+S(K-1,2p) \quad (29)$$

$$ds(k,2p)=S(K-1,2p)-S(K-2,2p) \quad (30)$$

The signals from adjacent odd sensors are then processed. Thereafter, at a given sampling level l, the following is defined:

$$s^{odd}(1,2p)=\tfrac{1}{2}(S(1,2p-1)+S(1,2p+1)) \quad (31)$$

$$ds^{odd}(1,2p)=s^{odd}(1,2p)-s^{odd}(l-1,2p) \quad (32)$$

It should be observed that $s(k,2p)$ above corresponds to an artificial (even) measurement, taken at level $k-3/2$. Similarly, $s^{odd}(1,2p)$ in equation (31) is none other than an artificial even sensor created by "odd" sensors adjacent to level l. Such calculation of measurements from fictional sensors is merely a preferred implementation and helps increase measurement reliability by taking the mean of two adjacent sensors situated in the same row. It should be observed that with respect to the geometrical configuration of the sensors, any "fictional" sensor disposed between two adjacent sensors in a given row lies vertically below the corresponding even sensor in the upper row (in the longitudinal direction of the tool or the well). For example, the "fictional" sensor that results from the measurement provided by lower sensors 1 and 3 lies vertically below sensor 2 in the upper row.

The following step consists in looking for a measurement of $s(k,2p)$ that matches the fictional measurements $sodd(1,2p)$, which requires an appropriate level l to be determined on the basis of the following criterion:

$$(s^{odd}(1,2p) - s(k,2p))(s^{odd}(1+1,2p) - s(k,2p)) \leq 0 \quad (33)$$

$$ds^{odd}(1+1,2p)ds(k,2p) \geq 0$$

This means that in order to select the level l, $s(k,2p)$ should lie between the two levels $sodd(1,2p)$ and $s^{odd}(1+1, 2p)$ and that the "slopes" should have the same sign. It is assumed that the signals are monotonous, so that the expression "$s(k,2p)$ lies between $s^{odd}(1,2p)$ and $s^{odd}(1+1,2p)$" means that k lies between l and l+1. l is taken as being successively equal to k+1, k+2, k+3, k−1, k+4. l* is defined as being the first integer in the list for which the condition is satisfied. The value l=k+1 is the first value to be selected because it is the most probable, since k+3/2 lies three levels after k−3/2. When the condition is never satisfied, then $w_u(k,2p)$ is taken as being equal to zero and the following sensor is used. However, if an integer l* has been determined, then linear interpolation is performed between l* and l*+1:

$$sh_u(k,2p)=l*-(k-3/2)+x/y \quad (34)$$

where x and y are defined as follows:

$$x=s(k,2p)-s^{odd}(l*,2p) \text{ and } y=ds^{odd}(l*+l,2p) \quad (35)$$

Figure 9:
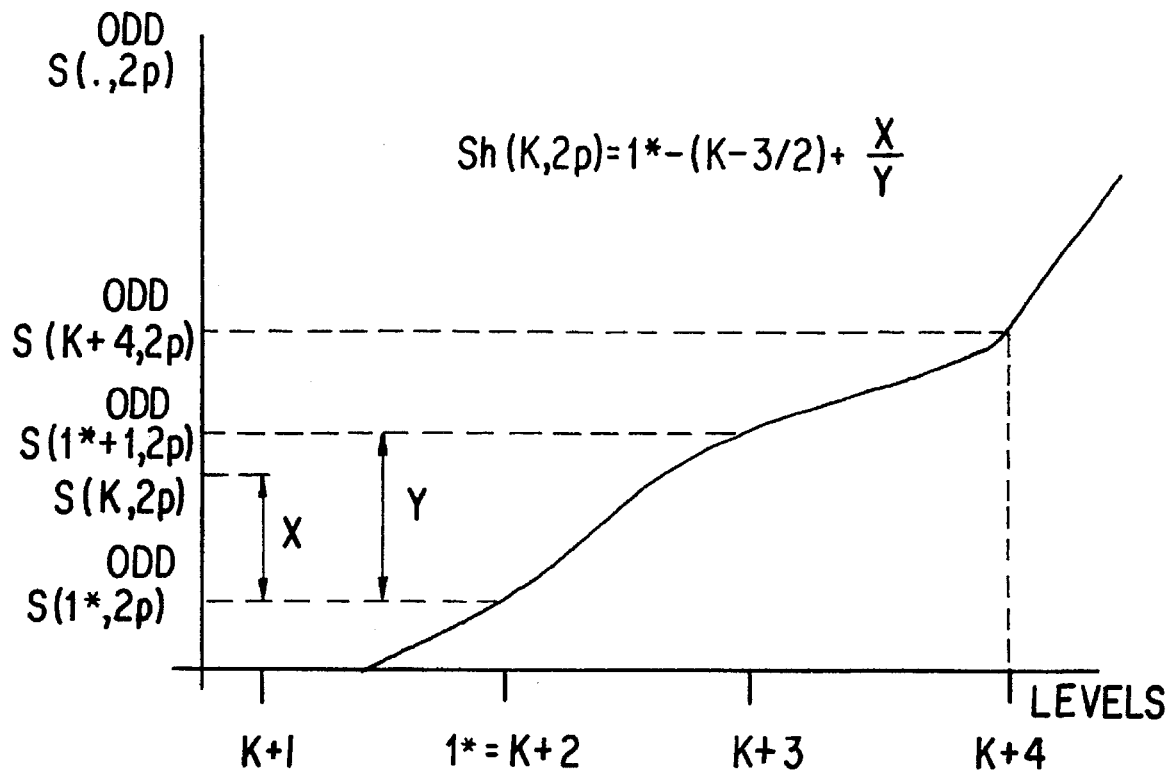
FIGS. 9 and 10 show how the true depth is determined by the method of the invention in the form of a plot of changes in measurement level as a function of depth levels.
Figure 10:
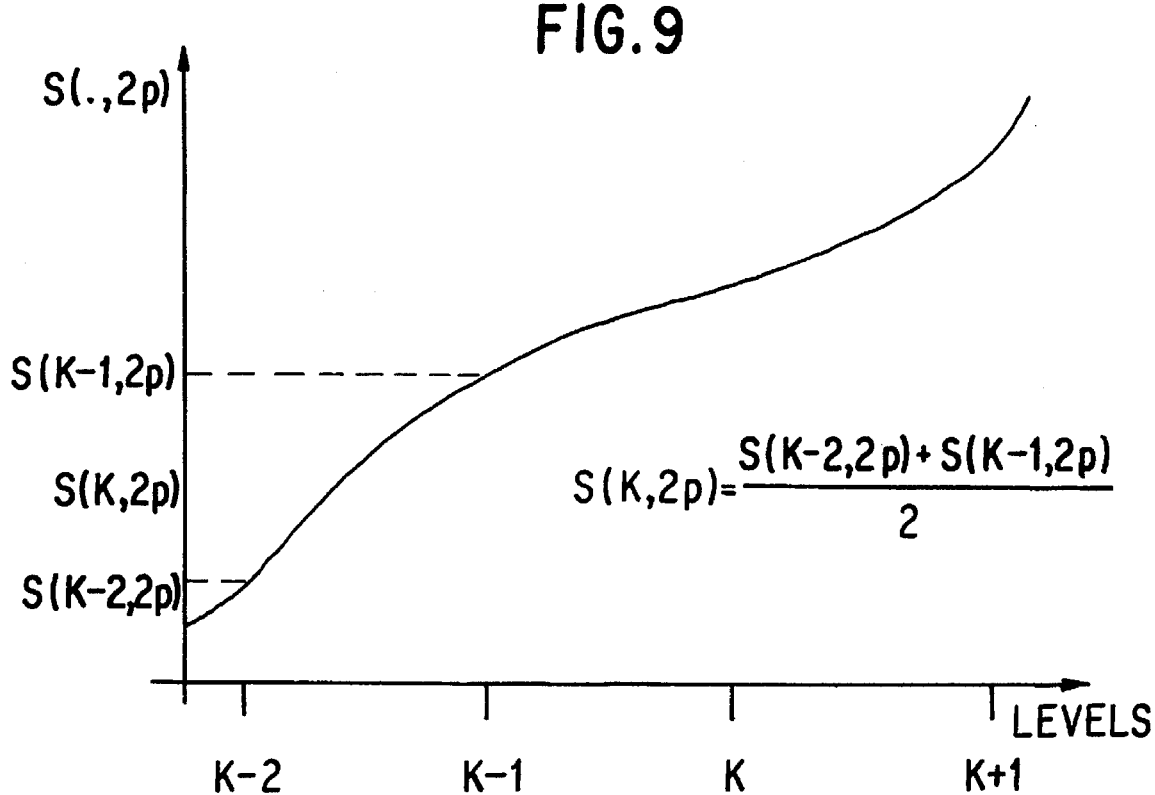
Figures 11A, 11B:
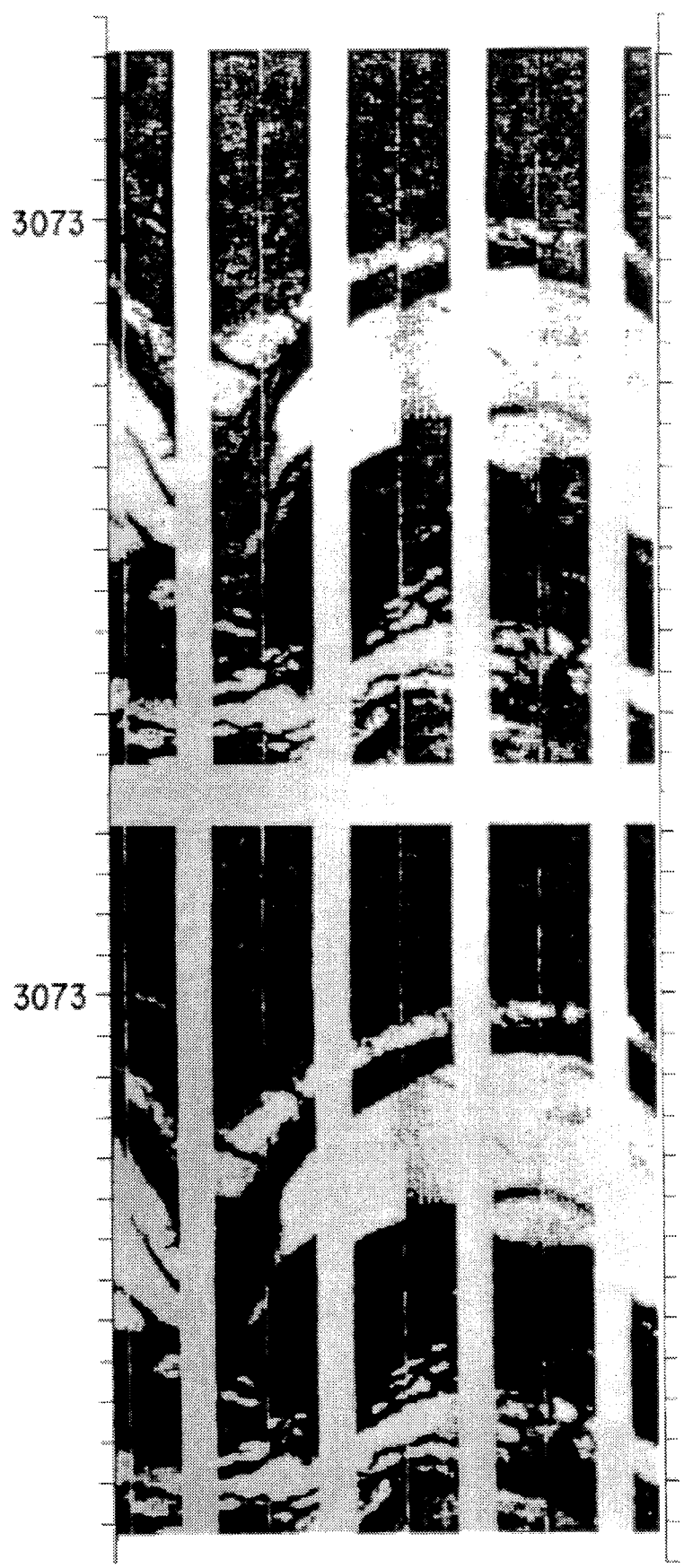
FIGS. 11A and 11B show images obtained by the tool of FIG. 1, respectively before and after correction.
Figure 12:
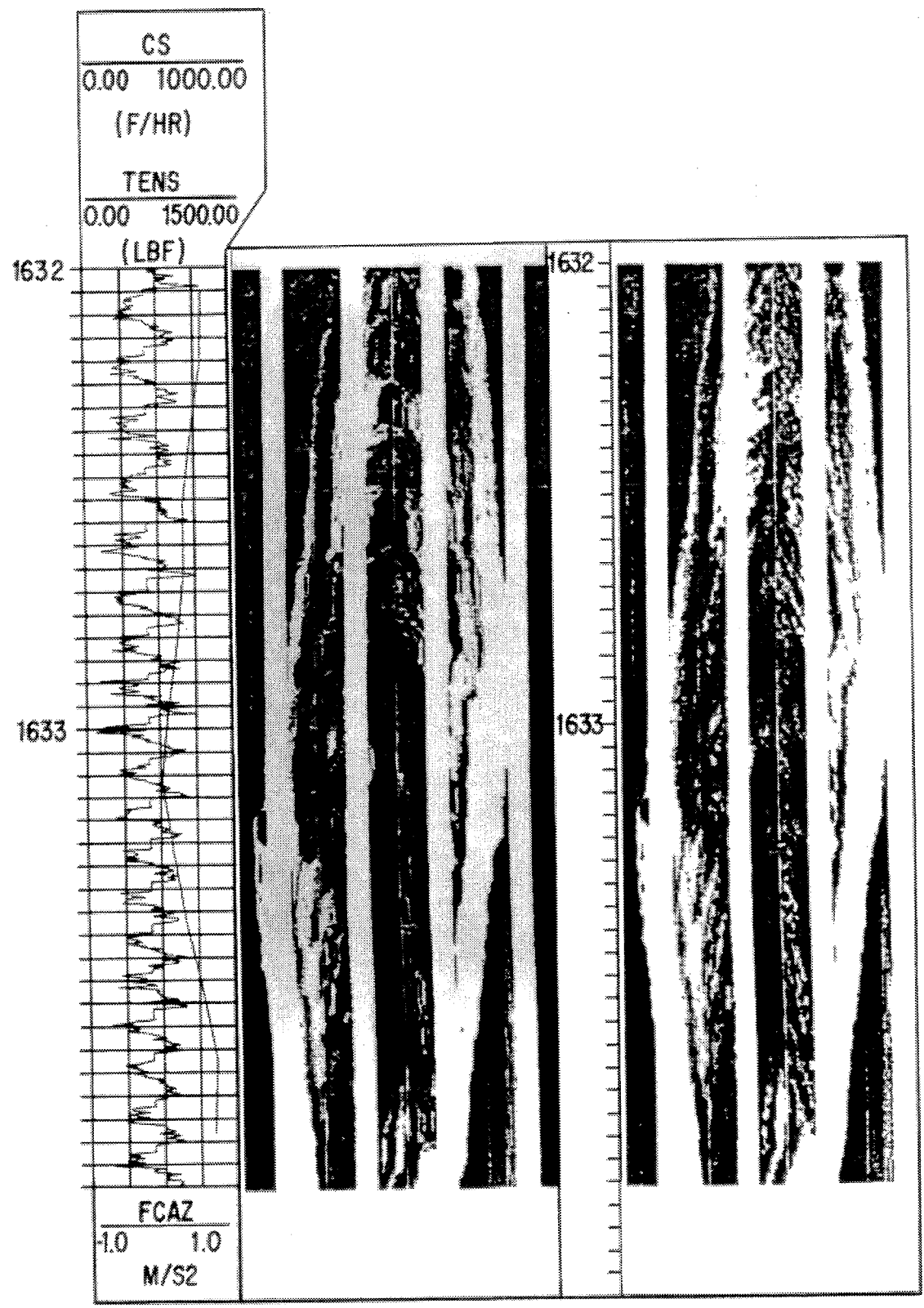
FIGS. 12 and 13 show other examples of images respectively before and after depth correction.
Figure 13:
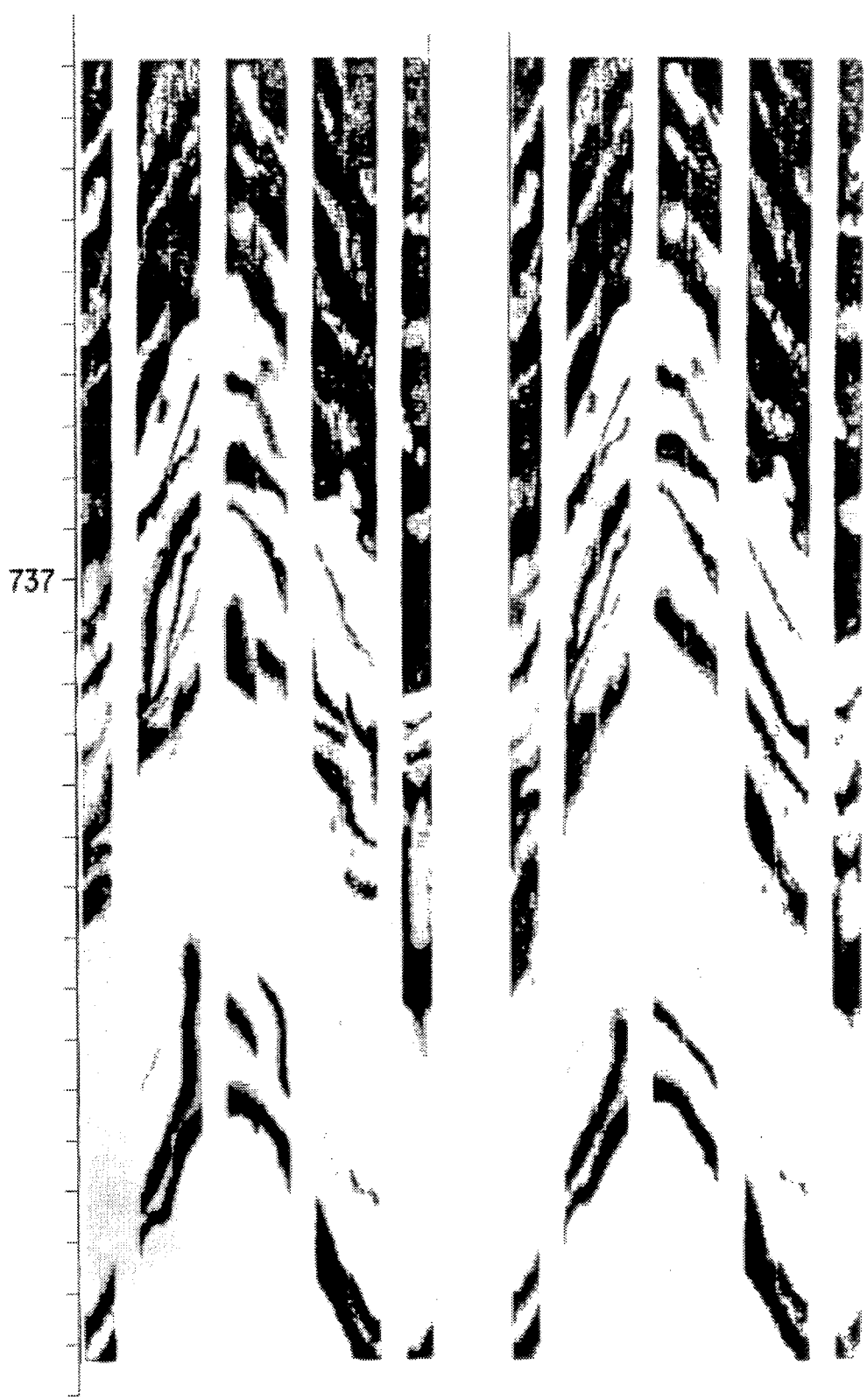
Figure 14:
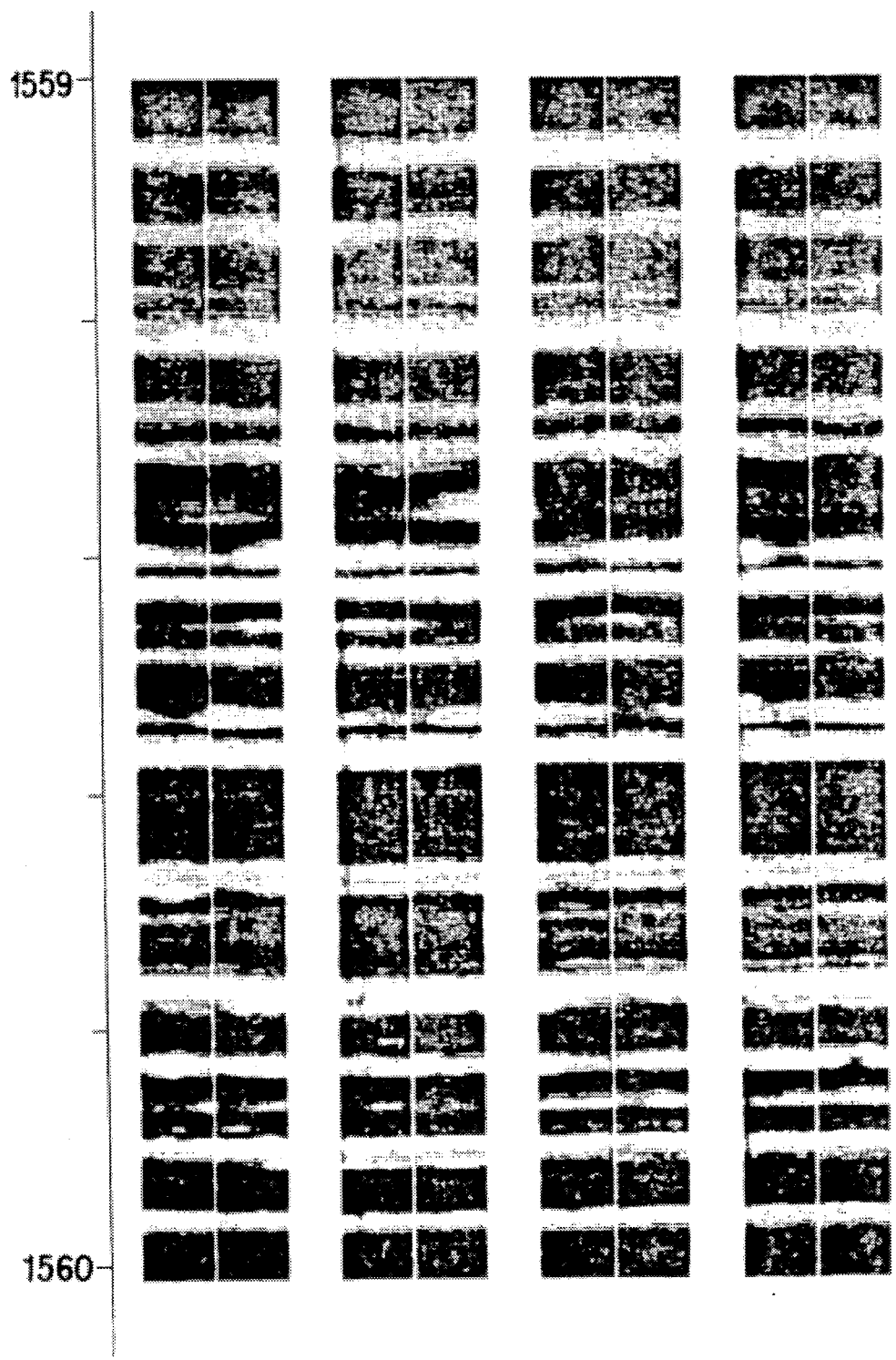
FIG. 14 shows the images of FIG. 3 after depth correction.

Reference is now made to FIGS. 9 and 10 which provide a graphical representation of the method of the invention, and thus constitute an illustration of the above-mentioned mathematical expressions.

More particularly, FIG. 9 is a graphical explanation of the expression written $sh_u(k,2p)$, whose lower and upper limit values given the available possibilities therefore are:

$$\tfrac{1}{2} \leq sh_u(k, 2p) \leq 6+\tfrac{1}{2} \quad (36)$$

When n=3, as is envisaged in the present description, it follows that the lower and upper limit values are as follows:

$$\frac{2}{39} \leq \frac{dTD}{dCD}(k) \leq 6 \quad (37)$$

In order to calculate $w_u(k,2p)$ the uncertainty on the value obtained for $sh_u(k,2p)$ is determined. The uncertainty is related to the term $D=x/y$, given that:

$$y=ds^{odd}(l*+1,2p)=s^{odd}(l*+1,2p)-s^{odd}(l*,2p) \quad (38)$$

$$x=s(k,2p)-s^{odd}(l*,2p) \quad (39)$$

this makes it possible to write:

$$\frac{\delta\Delta}{\Delta} = \frac{\delta x}{x} - \frac{\delta y}{y} = \frac{\delta s(k,2p)}{x} - \frac{\delta s^{odd}(l*+1,2p)}{y} - \delta s^{odd}(l*,2p)(1/x - 1/y) \quad (40)$$

in order to evaluate $<\delta D^2>$, it is assumed that the signals $$s(k,2p), s^{odd}(1,2p), s^{odd}(l*+1,2p) \quad (41)$$

are all affected by noise and that the noise signals are independent and have the same variance $<\delta D^2>$. The following can then be written:

$$\frac{<\delta D^2>}{\Delta^2} = <\delta s^2> \left( \frac{1}{x^2} + \frac{1}{y^2} + \left( \frac{1}{x} - \frac{1}{y} \right)^2 \right) \quad (42)$$

such that:

$$<\delta\Delta^2> = 2<\delta s^2> \left( \frac{x^2+y^2-xy}{y^4} \right) \quad (43)$$

The local weight is then selected as being proportional to $1/<\delta\Delta^2>$ and the following is obtained:

$$w_u(k,2p) = \alpha \left( \frac{y^4}{x^2 + y^2 - xy} \right) \quad (44)$$

where y is the slope between l* and l*+1. From the expression $w_u(k,2p)$ it can be seen that high confidence is obtained with signals having high contrast (i.e. values of y that are relatively large).

It should be observed that the value of $w_u(k,2p)$ has been multiplied by an additional factor $P(sh_u(k,j))$ where P is the probability density function that represents a priori knowledge on the geometry of the sensor. Because the two rows of sensors are separated by n.dz length units (inches), "concordance" should appear after about n levels. It is preferable to choose a function p of the Gauss function type having variance that is arbitrarily taken to be equal to (n/2).dz.

Once the local estimated values have been determined, equations (25-28) are used for determining a value of dTD/dCD(k) and of w(k) for each sampling level.

This information serves to provide an estimate of TD(k) using the following first order approximation:

$$TD(k+1) = TD(k) + \frac{dTD}{dCD}(k)(CD(k+1) - CD(k)) \quad (45)$$

$$TD(k+1) = TD(k) + \frac{dTD}{dCD}(k)dz \quad$$

since CD(k) is equal to k.dz. This can also be written as follows:

$$TD(k+1) = TD(k) + dz + \frac{d(TD - CD)}{dCD}(k)dz \quad (46)$$

when combined with equation (24), this becomes:

$$\frac{d(TD - CD)}{dCD}(k) = \frac{w_l(k)(n - sh_l(k)) + w_u(k)(n - sh_u(k))}{w_l(k)sh_l(k) + w_u(k)sh_u(k)} \quad (47)$$

Once again, the above cannot be integrated directly and use is made of a Kalman filter. In order to complete the model, estimation noise n(k) is inserted into equation (45), and the following can be written:

$$TD(k+1) = TD(k) + \left[ \frac{dTD}{dCD}(k) + N(k) \right] dz \quad (48)$$

Since w(k) corresponds to the confidence in the estimate of dTD/dCD(k), the following can be established:

$$E[N(k)^2] = Q(k) = 1/w(k) \quad (49)$$

and the true depth (TD) observation is likewise of the form:

$$Y(k) = CD(k) = TD(k) + W(k) \quad (50)$$

where W(k) is white noise of variance R(k). In addition, N(k) and W(k) are assumed to be independent.

The Kalman filter equations are then implemented (see equation (18)), with Sk=0.

FIGS. 11 to 14 show examples of images corrected in depth by the above method of the invention, and the beneficial effect of such correction can be seen on the images.

Similarly, each estimator has a weight given thereto when the variation between two consecutive measurements from the same sensor is large, thereby making it possible to avoid errors due to noise or other peripheral phenomenon that cannot be controlled.

For each pair of sensors, it is possible to obtain two estimators at each instant.

In order to eliminate, or at least reduce, the consequences of side effects, given the azimuth offset between the upper row of sensors relative to the lower row, the end sensor in each row is used solely for performing a "pseudo-measurement" as mentioned above. In other words, for example, data from sensor No. 1 is used only in conjunction with data from the adjacent sensor in the same row, i.e. sensor No. 3, so as to provide a pseudo-measurement corresponding to a pseudo-sensor situated vertically beneath sensor No. 2 in the upper row. In other words, the data from the end sensors is not used on its own but only in combination with data from other, adjacent sensors, thereby making it possible to reduce the corresponding weight and thus to eliminate or reduce the corresponding side effect.

Naturally the invention is not limited to a high resolution type tool, or to a sensor of the type suitable for measuring an electrical characteristic of geological strata, but extends to any type of tool.

We claim:

1. A method of determining a depth correction for a logging tool that is moved along a well, while suspended from the surface by means of a cable, said tool comprising at least two sensors that are offset longitudinally in the direction of movement of the tool for measuring a characteristic of the well at successive instants, the method comprising the steps of:

performing a measurement of tool depth at the surface at each of said instants;

at each of said instants, deriving a first value for tool velocity from a tool acceleration measurement;

at each of said instants, determining a second value of tool velocity by correlation between information received from said at least two sensors wherein said second velocity value is integrated by means of a Kalman filter including the steps of:

establishing a relationship between depth $X_k$ at instant $t_k$ and depth $X_{k+1}$ at instant $t_{k+1}$ in the following matrix form:

$$X_{k+1} = A_k X_k + B_k U_k + G_k W_k$$

$$Y_k = C_k X_k + V_k$$

where $X_k$ is a state vector whose components are state variables and constituted by a depth $z_k$ and velocity $v_k$ of the tool, $A_k$ and $B_k$ and $G_k$ are matrices having the following components: 0, 1, $t_{k+1}$; $C_k$ is a constant matrix; $Y_k$ is a matrix whose components include said measurements of acceleration, time instants, and the intrinsic depth measurement; $V_k$ and $W_k$ are matrices whose components are representative of measurement noise; and calculating an optimal estimate of depth Xk by minimizing a statistical criterion on the basis of said measurements of acceleration, of time instants, and of the intrinsic depth measurement, up to instant tk; and at each of said instants, combining the first and second velocity values and determining a depth correction to be applied to said surface depth measurement from the combined velocity values.

2. A method according to claim 1, wherein said calculating step comprises calculating said optimal estimate as an optimal estimate of linear type in a least squared sense.

3. A method according to claim 1, wherein said surface measurement of tool depth is a surface measurement of cable length from which said tool is suspended.

4. A method according to claim 1, further comprising the step of empirically determining beforehand variances $Q_k$ and $R_k$ and correlation coefficients $S_k$ relating to measurement noise by detecting corresponding instants and zones where said tool is jammed and stationary in the well, by calculating variance $\sigma^2_k$ of acceleration over a sliding window and by determining those zones in which said variance is very small compared with a standard mean deviation as calculated over a larger window.

5. A method according to claim 1, comprising the steps of:

comparing two consecutive measurements from said sensors;

obtaining a difference between said two measurements and comprising the difference with a given threshold, and;

when the difference exceeds the threshold, associating a weight with the corresponding estimate.

6. A method according to claim 1 further comprising the steps of:

taking into consideration data received by a first of said at least two sensors in an upper position at depth of level k;

searching for a number of levels $sh_u(k)$ for which another of said sensors that is in a lower position sees the same data at level k+shu(k);

similarly taking into account data seen by said lower sensor at level k;

searching for a number of levels $sh_1(k)$ which is such that said upper sensor sees the same data at level $k-sh_1(k)$;

defining an estimate of a derivative of true depth (TD) relative to the surface measurement of tool depth (CD) at level k by equation:

$$\frac{dTD}{dCD}(k) = \frac{[w_1(k) + w_u(k)]n}{w_1(k)sh_1(k) + w_u(k)sh_u(k)}$$

and integrating said derivative at each level k to obtain an estimate of the true depth (TD) at level k.

7. A method according to claim 6, wherein said level numbers shu(k) and shl(k) are integer numbers or numbers including fractions.

8. A method according to claim 6, wherein said tool includes a plurality of upper position sensors and a plurality of lower position sensors, disposed in two parallel rows, respectively a lower row and an upper row.

9. A method according to claim 8, comprising the step of calculating said level numbers $sh_u(k)$ and $sh_1(k)$ on a basis of a weighted mean of a set of local estimated values for each sensor of a corresponding row.

10. A method according to claim 8, wherein the two rows of sensors are offset in an azimuth direction, comprising the step of calculating a pseudo-measurement for one of the rows of given sensors, where said pseudo-measurement is a mean from two adjacent sensors.

11. A method according to claim 10, wherein said step of calculating a pseudo-measurement uses information from end sensors.

12. A method according to claim 6, comprising the step of equalizing the data received from the sensors so as to eliminate or attenuate differences in offset and in gain of electronic means associated with the sensors.

13. A method according to claim 12, further including the steps of calculating an estimate of tool velocity v*k, and using said estimate as a starting point for estimating a derivative of true depth relative to said parameters.

14. A method of characterizing a formation surrounding a borehole through which a logging tool is moved, the method comprising the steps of:

measuring a parameter of the formation at successive instants;

performing a measurement of tool depth at each of said instants;

at each of said instants, determining a first value for tool velocity by intrinsic measurement;

at each of said instants, determining a second value of tool velocity by correlation between information received from sensors on the tool for measuring the parameter of the formation;

at each of said instants, combining the first and second velocity values and determining a depth correction to be applied to said surface depth measurement from the combined velocity values; and using the measured parameters and the depth correction to characterize the formation.

15. A method according to claim 14, wherein said first velocity value is derived from a tool acceleration measurement.

16. A method according to claim 15, wherein said second velocity value is integrated by means of a Kalman filter, including the steps of:

establishing a relationship between depth $X_k$ at instant $t_k$ and depth $X_{k+1}$ at instant $t_{k+1}$ in the following matrix form:

$$X_{k+1} = A_k X_k + B_k U_k + G_k W_k$$

$$Y_k = C_k X_k + V_k$$

where $X_k$ is a state vector whose components are state variables and constituted by a depth $z_k$ and velocity $v_k$ of the tool, $A_k$ and $B_k$ and $G_k$ are matrices having the following components: 0, 1, $t_{k+1}$; $C_k$ is a constant matrix; $Y_k$ is a matrix whose components include said measurements of acceleration, time instants, and the intrinsic depth measurement; $V_k$ and $W_k$ are matrices whose components are representative of measurement noise; and calculating an optimal estimate of depth Xk by minimizing a statistical criterion on the basis of said measurements of acceleration, of time instants, and of the intrinsic depth measurement, up to instant tk.

17. A method according to claim 14, comprising obtaining a surface measurement of tool depth by measurement of cable length from which said tool is suspended.

18. A method according to claim 14, wherein the tool comprises at least two sensors offset in a longitudinal direction, the method further comprising the steps of:

comparing two consecutive measurements from said sensors;

obtaining a difference between said two measurements and comparing the difference with a given threshold, and;

when the difference exceeds the threshold, associating a weight with the corresponding estimate.

19. A method according to claim 18, wherein said tool includes a plurality of upper position sensors and a plurality of lower position sensors, disposed in two parallel rows, respectively a lower row and an upper row.

20. A method according to claim 19, wherein the two rows of sensors are offset in an azimuth direction, comprising the step of calculating a pseudo-measurement for one of the rows of given sensors, where said pseudo-measurement is a mean from two adjacent sensors.

21. A method according to claim 20, wherein said step of calculating a pseudo-measurement uses information from end sensors.

22. A method according to claim 18, comprising the step of equalizing the data received from the sensors so as to eliminate or attenuate differences in offset and in gain of electronic means associated with the sensors.

23. Apparatus for characterizing a formation surrounding a borehole comprising:

a logging tool that is suspended from the surface by means of a cable and displaced along a well, said tool including sensors for measuring a parameter of the formation at each of successive instants;

means for performing measurements of tool depth at said successive instants;

means for determining a first value for tool velocity at each of said instants by means of an intrinsic measurement;

means for determining a second value for the velocity of the tool at each of said instants by correlating measurements of the parameter of the formation made by said sensors;

means for combining the first and second velocity values at each of said instants to determine a depth correction to be applied to said depth measurement; and means for characterizing the formation on the basis of the measured parameters and the depth correction.

24. Apparatus according to claim 23, wherein the tool comprises at least two sensors offset in a longitudinal direction and includes means for comparing two consecutive measurements from said sensors;

means for obtaining a difference between said two measurements and comparing the difference with a given threshold, and;

means for associating a weight with the corresponding estimate when the difference exceeds the threshold.

25. Apparatus according to claim 24, wherein said tool includes a plurality of upper position sensors and a plurality of lower position sensors, disposed in two parallel rows, respectively a lower row and an upper row.

* * * * *